(12) United States Patent
Liu et al.

(10) Patent No.: US 10,436,565 B2
(45) Date of Patent: Oct. 8, 2019

(54) DEVICE FOR DETECTING CONCAVE-CONVEX OF FLANGE FACE OF WHEEL

(71) Applicant: CITIC Dicastal CO., LTD., Qinhuangdao, Hebei (CN)

(72) Inventors: Huiying Liu, Qinhuangdao (CN); Zhen Li, Qinhuangdao (CN); Yuexin Lu, Qinhuangdao (CN)

(73) Assignee: CITIC Dicastal CO., LTD., Qinhuangdao, Hebei (CN)

( * ) Notice: Subject to any disclaimer, the term of this patent is extended or adjusted under 35 U.S.C. 154(b) by 59 days.

(21) Appl. No.: 15/894,036

(22) Filed: Feb. 12, 2018

(65) Prior Publication Data
US 2019/0204060 A1   Jul. 4, 2019

(30) Foreign Application Priority Data
Dec. 29, 2017   (CN) .......................... 2017 1 1470418

(51) Int. Cl.
*G01B 5/20* (2006.01)
*G01B 5/00* (2006.01)
*G01M 1/00* (2006.01)

(52) U.S. Cl.
CPC ............. *G01B 5/20* (2013.01); *G01B 5/0004* (2013.01); *G01B 5/0025* (2013.01); *G01M 1/00* (2013.01)

(58) Field of Classification Search
CPC .......... G01B 5/20; G01B 17/02; G01B 3/002; G01B 3/22; G01B 5/0004; G01B 5/0025; G01B 5/207; G01B 5/285; G01B 7/16

USPC ........................................................ 33/203.12
See application file for complete search history.

(56) References Cited

U.S. PATENT DOCUMENTS

| | | | |
|---|---|---|---|
| 2019/0195611 A1* | 6/2019 | Liu | G01B 5/20 |
| 2019/0202019 A1* | 7/2019 | Liu | B24B 5/44 |
| 2019/0202020 A1* | 7/2019 | Liu | B24B 5/44 |
| 2019/0202034 A1* | 7/2019 | Liu | B24D 13/145 |
| 2019/0204060 A1* | 7/2019 | Liu | G01B 5/20 |

FOREIGN PATENT DOCUMENTS

| | | |
|---|---|---|
| CN | 104776823 A | 7/2015 |
| CN | 105881138 A | 8/2016 |
| CN | 106091874 A | 11/2016 |
| CN | 106840069 A | 6/2017 |
| CN | 107283000 A | 10/2017 |
| CN | 107300354 A | 10/2017 |
| CN | 107356192 A | 11/2017 |
| CN | 207585512 U | 7/2018 |

* cited by examiner

*Primary Examiner* — Yaritza Guadalupe-McCall
(74) *Attorney, Agent, or Firm* — Cooper Legal Group, LLC

(57) ABSTRACT

A device for detecting concave-convex of a flange face of a wheel is composed of a frame, a jacking cylinder, lower guide posts, a lifting table, a support column, a first inner ring adjusting cylinder, an inner ring guide rail, an second inner ring adjusting cylinder, a first inner ring sliding block, a second inner ring sliding block, a first electric cylinder, a second electric cylinder, a first detection bar, a second detection bar, piezoelectric sensors, a first outer ring adjusting cylinder, a second outer ring adjusting cylinder, a first outer ring guide rail, a second outer ring guide rail, a first outer ring sliding block, a second outer ring sliding block, a third electric cylinder, a fourth electric cylinder, a third detection bar, a fourth detection bar and the like.

1 Claim, 6 Drawing Sheets

DEVICE FOR DETECTING CONCAVE-CONVEX OF FLANGE FACE OF WHEEL

CROSS-REFERENCE TO RELATED APPLICATIONS

The present application claims benefit of Chinese Patent Application No. 201711470418.9, filed on Dec. 29, 2017, the contents of which are hereby incorporated by reference in its entirety.

BACKGROUND

A flange face of a wheel involves in cooperation during mounting, and the flange face must be concave but not convex according to the process requirement. In actual production, the common detection method, which is spot check with an artificial knife straight edge or with three coordinates, cannot satisfy 100% detection in automatic continuous production. Based on the current situation, the present patent provides a device for quickly detecting whether a flange face of a wheel is concave, which can be used for 100% detection in automatic production.

SUMMARY

The disclosure relates to the technical field of wheel detection, and specifically, to a device for detecting whether a flange face of a wheel is concave.

The aim of the disclosure is to provide a device for quickly detecting concave-convex of a flange face of a wheel, which can be used for 100% detection in automatic production. The device is advanced, stable, efficient and high in degree of automation.

In order to fulfill the above aim, the technical solution of the disclosure is: a device for detecting concave-convex of a flange face of a wheel is composed of a frame, a jacking cylinder, lower guide posts, a lifting table, a support column, a first inner ring adjusting cylinder, an inner ring guide rail, a second inner ring adjusting cylinder, a first inner ring sliding block, a second inner ring sliding block, a first electric cylinder, a second electric cylinder, a first detection bar, a second detection bar, piezoelectric sensors, a first outer ring adjusting cylinder, a second outer ring adjusting cylinder, a first outer ring guide rail, a second outer ring guide rail, a first outer ring sliding block, a second outer ring sliding block, a third electric cylinder, a fourth electric cylinder, a third detection bar, a fourth detection bar, a positioning cylinder, a left sliding plate, a right sliding plate, a first gear rack, positioning columns, an upper cylinder, a mobile platform, upper guide posts, a servo motor, a rotating table, a clamping guide rail, a clamping cylinder, a right sliding table, a second gear rack, a left sliding table, clamping arms and clamping jaws.

The positioning cylinder is fixed on the frame, the output end of the positioning cylinder is connected with the left sliding plate, the left sliding plate and the right sliding plate are mounted on a guide rail and connected with each other via the first gear rack, and the four positioning columns are symmetrically mounted on the left sliding plate and the right sliding plate. The positioning cylinder is started to drive the left sliding plate and the right sliding plate to move synchronously, and a wheel can be pre-positioned on a roller bed via the positioning columns.

The four lower guide posts are fixed at the bottom of the frame, the jacking cylinder is fixed in the center of the bottom of the frame, the output end of the jacking cylinder is connected with the lifting table, and the support column is mounted on the lifting table. After the wheel is pre-positioned, the positioning columns are reset, the jacking cylinder is started to drive the support column to move up, and the support column can jack the wheel after contacting a flange face of the wheel, so that the inner rim of the wheel leaves the roller bed.

The upper cylinder is fixed above the frame, the output end of the upper cylinder is connected with the mobile platform, and the upper cylinder can control the mobile platform to move up and down under the guidance of the four upper guide posts. The servo motor is fixed on the mobile platform via a mounting rack, the output end of the servo motor is connected with the rotating table, the clamping guide rail is fixed on the rotating table, and the left sliding table and the right sliding table are symmetrically mounted on the clamping guide rail and connected with each other via the second gear rack. The clamping cylinder is fixed on the rotating table, the output end of the clamping cylinder is connected with the right sliding table, the four clamping arms are symmetrically mounted on the left sliding table and the right sliding table, and a clamping jaw is mounted at the tail end of each clamping arm. When the wheel is jacked certain height by the support column, the upper cylinder is started to drive the mobile platform to move down, the four clamping jaws are located outside the inner rim of the wheel, then the clamping cylinder is started to drive the left sliding table and the right sliding table to move synchronously, the inner rim of the wheel is clamped by the clamping jaws, and the wheel is thus positioned and clamped. Since the inner rim of the wheel and the flange face of the wheel are machined on a first-procedure lathe, high-precision positioning of the wheel at the moment is realized before detection.

A transverse groove and two longitudinal grooves are formed inside the support column, the first inner ring adjusting cylinder and the second inner ring adjusting cylinder are symmetrically mounted in the transverse groove, the output end of the first inner ring adjusting cylinder is connected with the first inner ring sliding block, the output end of the second inner ring adjusting cylinder is connected with the second inner ring sliding block, and both the first inner ring sliding block and the second inner ring sliding block are mounted on the inner ring guide rail. The first electric cylinder is mounted on the first inner ring sliding block, the first detection bar is mounted at the output end of the first electric cylinder, and a piezoelectric sensor is mounted on the first detection bar; the second electric cylinder is mounted on the second inner ring sliding block, the second detection bar is mounted at the output end of the second electric cylinder, and a piezoelectric sensor is mounted on the second detection bar. The first detection bar and the second detection bar are used for detecting the inner ring of a flange of the wheel, and the distance between the first detection bar and the second detection bar can be adjusted via the first inner ring adjusting cylinder and the second inner ring adjusting cylinder, so that the inner rings of multiple flange diameters can be detected, and the universality is wider.

The first outer ring adjusting cylinder and the second outer ring adjusting cylinder are symmetrically mounted in the longitudinal grooves, the output end of the first outer ring adjusting cylinder is connected with the first outer ring sliding block, the output end of the second outer ring adjusting cylinder is connected with the second outer ring sliding block, the first outer ring sliding block is mounted on the first outer ring guide rail, and the second outer ring sliding block is mounted on the second outer ring guide rail. The third electric cylinder is mounted on the first outer ring sliding block, the third detection bar is mounted at the output end of the third electric cylinder, and a piezoelectric sensor is mounted on the third detection bar; the fourth electric cylinder is mounted on the second outer ring sliding block, the fourth detection bar is mounted at the output end of the fourth electric cylinder, and a piezoelectric sensor is mounted on the fourth detection bar. The third detection bar and the fourth detection bar are used for detecting the outer ring of the flange of the wheel, and the distance between the third detection bar and the fourth detection bar can be adjusted via the first outer ring adjusting cylinder and the second outer ring adjusting cylinder, so that the outer rings of multiple flange diameters can be detected, and the universality is wider.

When the flange of the wheel is concave, the inner ring of the flange face is low, and the outer ring is high. When the first detection bar, the second detection bar, the third detection bar and the fourth detection bar which have equal height simultaneously approach the flange face, the third detection bar and the fourth detection bar receive signals from the piezoelectric sensors first due to the high outer ring, then the first detection bar and the second detection bar receive signals from the piezoelectric sensors due to the low inner ring, and the flange of the wheel is judged to be concave in such a way that the time when the first detection bar and the second detection bar receive signals is later than the time when the third detection bar and the fourth detection bar receive signals.

When the flange of the wheel is convex, the inner ring of the flange face is high, and the outer ring is low. When the first detection bar, the second detection bar, the third detection bar and the fourth detection bar which have equal height simultaneously approach the flange face, the first detection bar and the second detection bar receive signals from the piezoelectric sensors first due to the high inner ring, then the third detection bar and the fourth detection bar receive signals from the piezoelectric sensors due to the low outer ring, and the convex flange of the wheel is judged in such a way that the time when the first detection bar and the second detection bar receive signals is earlier than the time when the third detection bar and the fourth detection bar receive signals.

After the wheel is clamped and positioned by the clamping jaws, the upper cylinder is started to drive the mobile platform to move up certain distance, at the moment, the flange face of the wheel leaves the support column, next, the first electric cylinder, the second electric cylinder, the third electric cylinder and the fourth electric cylinder are simultaneously started, the first detection bar, the second detection bar, the third detection bar and the fourth detection bar which have equal height simultaneously approach the flange face, and whether the flange of the wheel is concave or convex is judged via the sequence of time when the first detection bar and the second detection bar receive signals and time when the third detection bar and the fourth detection bar receive signals. The first detection bar, the second detection bar, the third detection bar and the fourth detection bar are oblong, and the lengths of the detection bars are required to be greater than the width of a drainage channel, thus eliminating the influence of the flange drainage channel on the detection result. After the detection is completed the once, all the detection bars are reset, the servo motor is started to drive the clamped wheel to rotate certain angle, and then the wheel is redetected via the detection bars. After multiple times of redetection, when all the detection results are concave, the flange face of the wheel is judged to be concave, otherwise, the flange face of the wheel is convex.

The working process of the device for detecting concave-convex of the flange face of the wheel is: firstly, according to the flange face of the wheel produced on line, the distance between the first detection bar and the second detection bar and the distance between the third detection bar and the fourth detection bar are adjusted; after the wheel enters the device, the positioning cylinder is started to drive the left sliding plate and the right sliding plate to move synchronously, and the wheel is pre-positioned on the roller bed via the positioning columns; after the wheel is pre-positioned, the positioning columns are reset, the jacking cylinder is started to drive the support column to move up, and the support column can jack the wheel after contacting the flange face of the wheel, so that the inner rim of the wheel leaves the roller bed; when the wheel is jacked certain height by the support column, the upper cylinder is started to drive the mobile platform to move down, the four clamping jaws are located outside the inner rim of the wheel, then the clamping cylinder is started to drive the left sliding table and the right sliding table to move synchronously, the inner rim of the wheel is clamped by the clamping jaws, the wheel is thus positioned and clamped, and high-precision positioning of the wheel at the moment is realized before detection; after the wheel is clamped and positioned by the clamping jaws, the upper cylinder is started to drive the mobile platform to move up certain distance, and at the moment, the flange face of the wheel leaves the support column; next, the first electric cylinder, the second electric cylinder, the third electric cylinder and the fourth electric cylinder are simultaneously started, the first detection bar, the second detection bar, the third detection bar and the fourth detection bar which have equal height simultaneously approach the flange face, and the flange of the wheel is judged to be concave in such a way that the time when the first detection bar and the second detection bar receive signals is later than the time when the third detection bar and the fourth detection bar receive signals; and the flange of the wheel is judged to be convex in such a way that the time when the first detection bar and the second detection bar receive signals is earlier than the time when the third detection bar and the fourth detection bar receive signals. After the detection is completed the once, the four detection bars are reset, the servo motor is started to drive the clamped wheel to rotate certain angle, and then the wheel is redetected via the detection bars. After multiple times of redetection, when all the detection results are concave, the flange face of the wheel is judged to be concave, otherwise, the flange face of the wheel is convex. Finally, after the detection, the four detection bars are reset, the clamping jaws loosen the wheel, and the wheel falls back to the roller bed via the support column and rotates downward.

The disclosure can be used for 100% detection about whether a flange face is concave in automatic production, and has the characteristics of advanced process, high stability and efficiency, high automation degree and the like.

Figure 1:
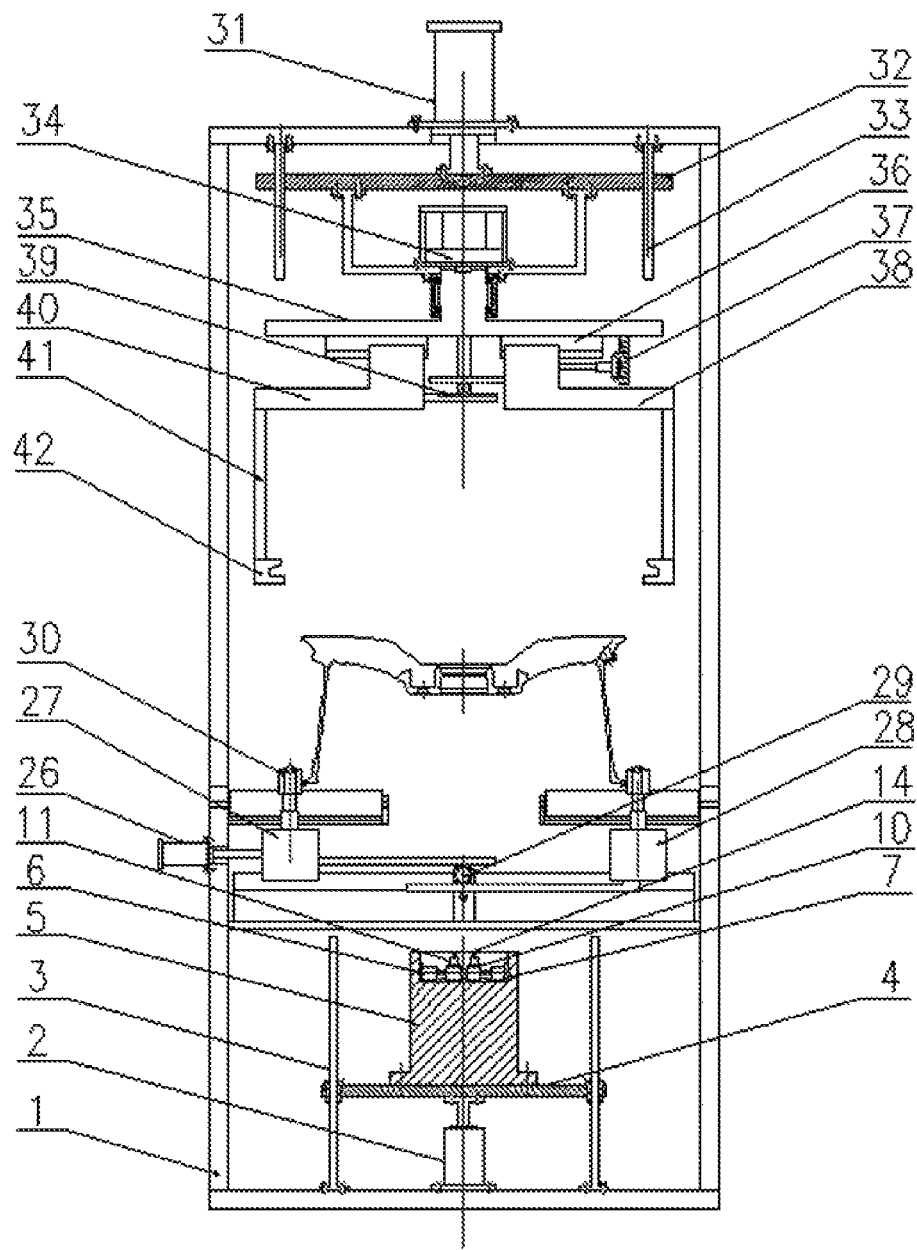
FIG. 1 is a front view of a device for detecting concave-convex of a flange face of a wheel in the disclosure.
Figure 2:
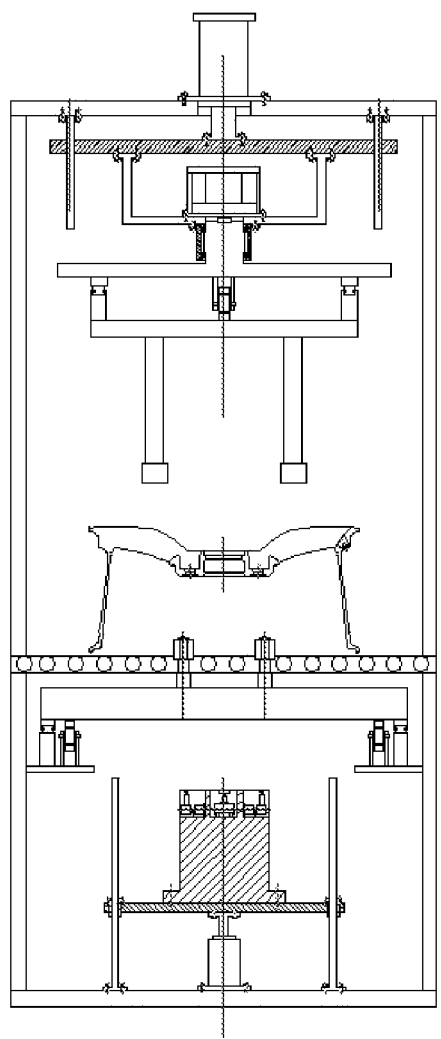
FIG. 2 is a left view of the device for detecting concave-convex of the flange face of the wheel in the disclosure.
Figure 3:
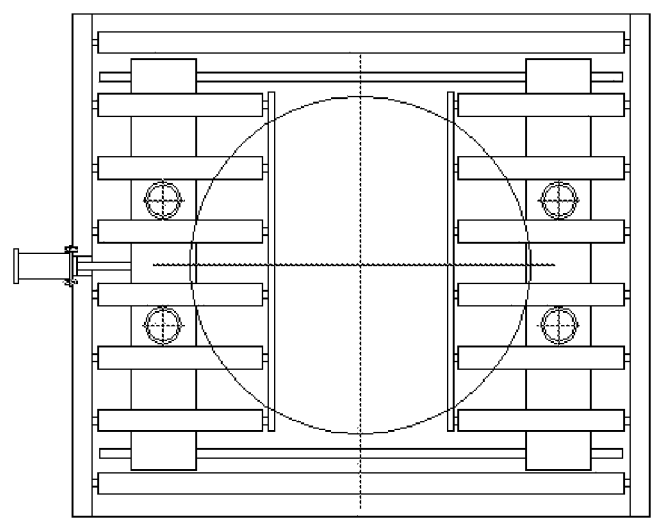
FIG. 3 is a top view of the device for detecting concave-convex of the flange face of the wheel in the disclosure.
Figure 4:
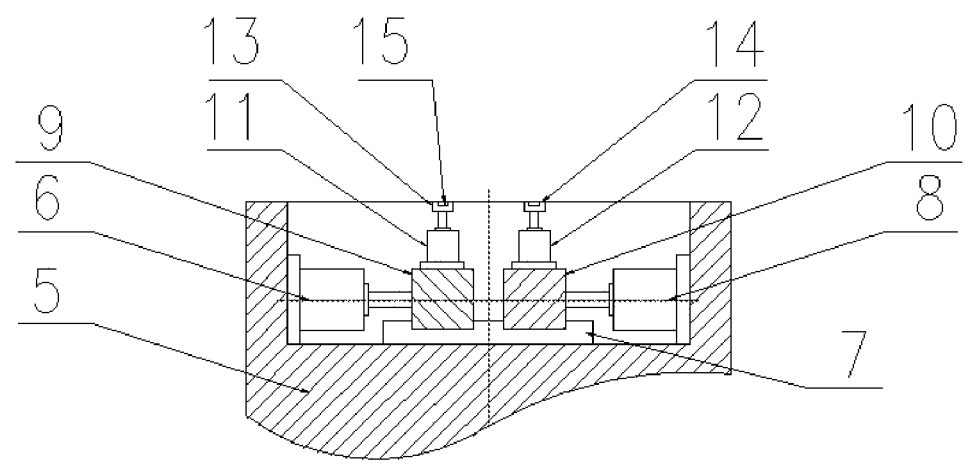
FIG. 4 is a partial front view of a detection part of the device for detecting concave-convex of the flange face of the wheel in the disclosure.
Figure 5:
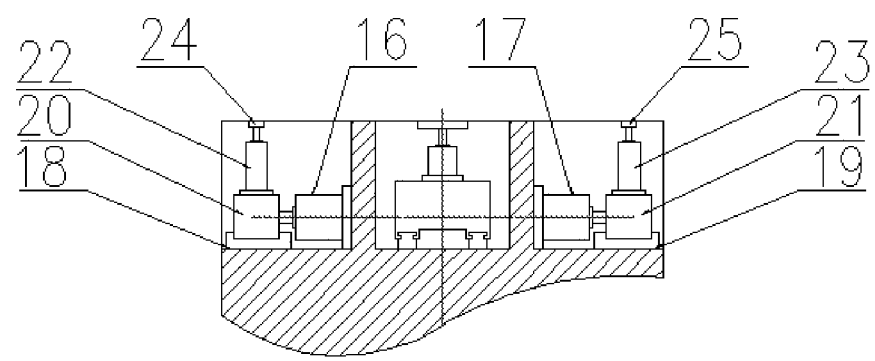
FIG. 5 is a partial left view of the detection part of the device for detecting concave-convex of the flange face of the wheel in the disclosure.
Figure 6:
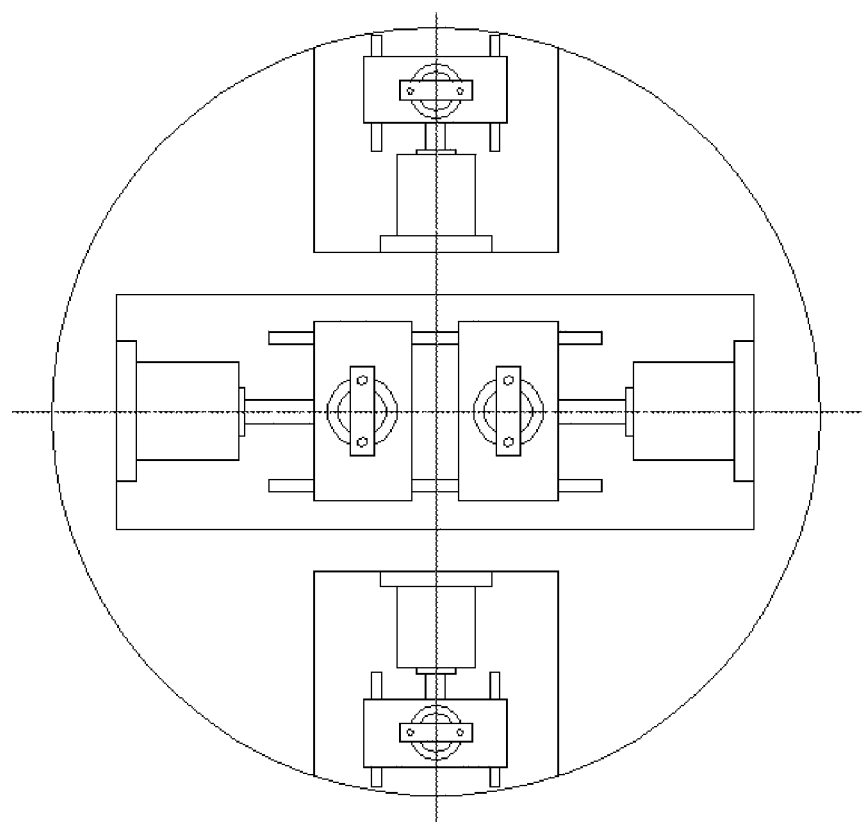
FIG. 6 is a partial top view of the detection part of the device for detecting concave-convex of the flange face of the wheel in the disclosure.

LIST OF REFERENCE SYMBOLS 1 frame
2 jacking cylinder
3 lower guide post
4 lifting table
5 support column
6 first inner ring adjusting cylinder
7 inner ring guide rail
8 second inner ring adjusting cylinder
9 first inner ring sliding block
10 second inner ring sliding block
11 first electric cylinder
12 second electric cylinder
13 first detection bar
14 second detection bar
15 piezoelectric sensor
16 first outer ring adjusting cylinder
17 second outer ring adjusting cylinder
18 first outer ring guide rail
19 second outer ring guide rail
20 first outer ring sliding block
21 second outer ring sliding block
22 third electric cylinder
23 fourth electric cylinder
24 third detection bar
25 fourth detection bar
26 positioning cylinder
27 left sliding plate
28 right sliding plate
29 first gear rack
30 positioning column
31 upper cylinder
32 mobile platform
33 upper guide post
34 servo motor
35 rotating table
36 clamping guide rail
37 clamping cylinder
38 right sliding table
39 second gear rack
40 left sliding table
41 clamping arm
42 clamping jaw

DETAILED DESCRIPTION

Specific details and working conditions of a device provided by the disclosure will be given below in combination with the accompanying drawings.

A device for detecting concave-convex of a flange face of a wheel is composed of a frame 1, a jacking cylinder 2, lower guide posts 3, a lifting table 4, a support column 5, a first inner ring adjusting cylinder 6, an inner ring guide rail 7, a second inner ring adjusting cylinder 8, a first inner ring sliding block 9, a second inner ring sliding block 10, a first electric cylinder 11, a second electric cylinder 12, a first detection bar 13, a second detection bar 14, piezoelectric sensors 15, a first outer ring adjusting cylinder 16, a second outer ring adjusting cylinder 17, a first outer ring guide rail 18, a second outer ring guide rail 19, a first outer ring sliding block 20, a second outer ring sliding block 21, a third electric cylinder 22, a fourth electric cylinder 23, a third detection bar 24, a fourth detection bar 25, a positioning cylinder 26, a left sliding plate 27, a right sliding plate 28, a first gear rack 29, positioning columns 30, an upper cylinder 31, a mobile platform 32, upper guide posts 33, a servo motor 34, a rotating table 35, a clamping guide rail 36, a clamping cylinder 37, a right sliding table 38, a second gear rack 39, a left sliding table 40, clamping arms 41 and clamping jaws 42.

The positioning cylinder 26 is fixed on the frame 1, the output end of the positioning cylinder 26 is connected with the left sliding plate 27, the left sliding plate 27 and the right sliding plate 28 are mounted on a guide rail and connected with each other via the first gear rack 29, and the four positioning columns 30 are symmetrically mounted on the left sliding plate 27 and the right sliding plate 28. The positioning cylinder 26 is started to drive the left sliding plate 27 and the right sliding plate 28 to move synchronously, and a wheel can be pre-positioned on a roller bed via the positioning columns 30.

The four lower guide posts 3 are fixed at the bottom of the frame 1, the jacking cylinder 2 is fixed in the center of the bottom of the frame 1, the output end of the jacking cylinder 2 is connected with the lifting table 4, and the support column 5 is mounted on the lifting table 4. After the wheel is pre-positioned, the positioning columns 30 are reset, the jacking cylinder 2 is started to drive the support column 5 to move up, and the support column 5 can jack the wheel after contacting a flange face of the wheel, so that the inner rim of the wheel leaves the roller bed.

The upper cylinder 31 is fixed above the frame 1, the output end of the upper cylinder 31 is connected with the mobile platform 32, and the upper cylinder 31 can control the mobile platform 32 to move up and down under the guidance of the four upper guide posts 33. The servo motor 34 is fixed on the mobile platform 32 via a mounting rack, the output end of the servo motor 34 is connected with the rotating table 35, the clamping guide rail 36 is fixed on the rotating table 35, and the left sliding table 40 and the right sliding table 38 are symmetrically mounted on the clamping guide rail 36 and connected with each other via the second gear rack 39. The clamping cylinder 37 is fixed on the rotating table 35, the output end of the clamping cylinder 37 is connected with the right sliding table 38, the four clamping arms 41 are symmetrically mounted on the left sliding table 40 and the right sliding table 38, and a clamping jaw 42 is mounted at the tail end of each clamping arm 41. When the wheel is jacked certain height by the support column 5, the upper cylinder 31 is started to drive the mobile platform 32 to move down, the four clamping jaws 42 are located outside the inner rim of the wheel, then the clamping cylinder 37 is started to drive the left sliding table 40 and the right sliding table 38 to move synchronously, the inner rim of the wheel is clamped by the clamping jaws 42, and the wheel is thus positioned and clamped. Since the inner rim of the wheel and the flange face of the wheel are machined on a first-procedure lathe, high-precision positioning of the wheel at the moment is realized before detection.

A transverse groove and two longitudinal grooves are formed inside the support column 5, the first inner ring adjusting cylinder 6 and the second inner ring adjusting cylinder 8 are symmetrically mounted in the transverse groove, the output end of the first inner ring adjusting cylinder 6 is connected with the first inner ring sliding block 9, the output end of the second inner ring adjusting cylinder 8 is connected with the second inner ring sliding block 10, and both the first inner ring sliding block 9 and the second inner ring sliding block 10 are mounted on the inner ring guide rail 7. The first electric cylinder 11 is mounted on the first inner ring sliding block 9, the first detection bar 13 is mounted at the output end of the first electric cylinder 11, and a piezoelectric sensor 15 is mounted on the first detection bar 13; the second electric cylinder 12 is mounted on the second inner ring sliding block 10, the second detection bar 14 is mounted at the output end of the second electric cylinder 12, and a piezoelectric sensor 15 is mounted on the second detection bar 14. The first detection bar 13 and the second detection bar 14 are used for detecting the inner ring of a flange of the wheel, and the distance between the first detection bar 13 and the second detection bar 14 can be adjusted via the first inner ring adjusting cylinder 6 and the second inner ring adjusting cylinder 8, so that the inner rings of multiple flange diameters can be detected, and the universality is wider.

The first outer ring adjusting cylinder 16 and the second outer ring adjusting cylinder 17 are symmetrically mounted in the longitudinal grooves, the output end of the first outer ring adjusting cylinder 16 is connected with the first outer ring sliding block 20, the output end of the second outer ring adjusting cylinder 17 is connected with the second outer ring sliding block 21, the first outer ring sliding block 20 is mounted on the first outer ring guide rail 18, and the second outer ring sliding block 21 is mounted on the second outer ring guide rail 19. The third electric cylinder 22 is mounted on the first outer ring sliding block 20, the third detection bar 24 is mounted at the output end of the third electric cylinder 22, and a piezoelectric sensor 15 is mounted on the third detection bar 24; the fourth electric cylinder 23 is mounted on the second outer ring sliding block 21, the fourth detection bar 25 is mounted at the output end of the fourth electric cylinder 23, and a piezoelectric sensor 15 is mounted on the fourth detection bar 25. The third detection bar 24 and the fourth detection bar 25 are used for detecting the outer ring of the flange of the wheel, and the distance between the third detection bar 24 and the fourth detection bar 25 can be adjusted via the first outer ring adjusting cylinder 16 and the second outer ring adjusting cylinder 17, so that the outer rings of multiple flange diameters can be detected, and the universality is wider.

When the flange of the wheel is concave, the inner ring of the flange face is low, and the outer ring is high. When the first detection bar 13, the second detection bar 14, the third detection bar 24 and the fourth detection bar 25 which have equal height simultaneously approach the flange face, the third detection bar 24 and the fourth detection bar 25 receive signals from the piezoelectric sensors 15 first due to the high outer ring, then the first detection bar 13 and the second detection bar 14 receive signals from the piezoelectric sensors 15 due to the low inner ring, and the flange of the wheel is judged to be concave in such a way that the time when the first detection bar 13 and the second detection bar 14 receive signals is later than the time when the third detection bar 24 and the fourth detection bar 25 receive signals.

When the flange of the wheel is convex, the inner ring of the flange face is high, and the outer ring is low. When the first detection bar 13, the second detection bar 14, the third detection bar 24 and the fourth detection bar 25 which have equal height simultaneously approach the flange face, the first detection bar 13 and the second detection bar 14 receive signals from the piezoelectric sensors 15 first due to the high inner ring, then the third detection bar 24 and the fourth detection bar 25 receive signals from the piezoelectric sensors 15 due to the low outer ring, and the convex flange of the wheel is judged in such a way that the time when the first detection bar 13 and the second detection bar 14 receive signals is earlier than the time when the third detection bar 24 and the fourth detection bar 25 receive signals.

After the wheel is clamped and positioned by the clamping jaws 42, the upper cylinder 31 is started to drive the mobile platform 32 to move up certain distance, at the moment, the flange face of the wheel leaves the support column 5, next, the first electric cylinder 11, the second electric cylinder 12, the third electric cylinder 22 and the fourth electric cylinder 23 are simultaneously started, the first detection bar 13, the second detection bar 14, the third detection bar 24 and the fourth detection bar 25 which have equal height simultaneously approach the flange face, and whether the flange of the wheel is concave or convex is judged via the sequence of time when the first detection bar 13 and the second detection bar 14 receive signals and time when the third detection bar 24 and the fourth detection bar 25 receive signals. The first detection bar 13, the second detection bar 14, the third detection bar 24 and the fourth detection bar 25 are oblong, and the lengths of the detection bars are required to be greater than the width of a drainage channel, thus eliminating the influence of the flange drainage channel on the detection result. After the detection is completed the once, all the detection bars are reset, the servo motor 34 is started to drive the clamped wheel to rotate certain angle, and then the wheel is redetected via the detection bars. After multiple times of redetection, when all the detection results are concave, the flange face of the wheel is judged to be concave, otherwise, the flange face of the wheel is convex.

The working process of the device for detecting concave-convex of the flange face of the wheel is: firstly, according to the flange face of the wheel produced on line, the distance between the first detection bar 13 and the second detection bar 14 and the distance between the third detection bar 24 and the fourth detection bar 25 are adjusted; after the wheel enters the device, the positioning cylinder 26 is started to drive the left sliding plate 27 and the right sliding plate 28 to move synchronously, and the wheel is pre-positioned on the roller bed via the positioning columns 30; after the wheel is pre-positioned, the positioning columns 30 are reset, the jacking cylinder 2 is started to drive the support column 5 to move up, and the support column 5 can jack the wheel after contacting the flange face of the wheel, so that the inner rim of the wheel leaves the roller bed; when the wheel is jacked certain height by the support column 5, the upper cylinder 31 is started to drive the mobile platform 32 to move down, the four clamping jaws 42 are located outside the inner rim of the wheel, then the clamping cylinder 37 is started to drive the left sliding table 40 and the right sliding table 38 to move synchronously, the inner rim of the wheel is clamped by the clamping jaws 42, the wheel is thus positioned and clamped, and high-precision positioning of the wheel at the moment is realized before detection; after the wheel is clamped and positioned by the clamping jaws 42, the upper cylinder 31 is started to drive the mobile platform 32 to move up certain distance, and at the moment, the flange face of the wheel leaves the support column 5; next, the first electric cylinder 11, the second electric cylinder 12, the third electric cylinder 22 and the fourth electric cylinder 23 are simultaneously started, the first detection bar 13, the second detection bar 14, the third detection bar 24 and the fourth detection bar 25 which have equal height simultaneously approach the flange face, and the flange of the wheel is judged to be concave in such a way that the time when the first detection bar 13 and the second detection bar 14 receive signals is later than the time when the third detection bar 24 and the fourth detection bar 25 receive signals; and the flange of the wheel is judged to be convex in such a way that the time when the first detection bar 13 and the second detection bar 14 receive signals is earlier than the time when the third detection bar 24 and the fourth detection bar 25 receive signals. After the detection is completed the once, the four detection bars are reset, the servo motor 34 is started to drive the clamped wheel to rotate certain angle, and then the wheel is redetected via the detection bars. After multiple times of redetection, when all the detection results are concave, the flange face of the wheel is judged to be concave, otherwise, the flange face of the wheel is convex. Finally, after the detection, the four detection bars are reset, the clamping jaws 42 loosen the wheel, and the wheel falls back to the roller bed via the support column 5 and rotates downward.

The device of the disclosure can be used for 100% detection about whether the flange face is concave in automatic production, and has the characteristics of advanced process, high stability and efficiency, high automation degree and the like.

The invention claimed is:

1. A device for detecting concave-convex of a flange face of a wheel, being composed of a frame, a jacking cylinder, lower guide posts, a lifting table, a support column, a first inner ring adjusting cylinder, an inner ring guide rail, a second inner ring adjusting cylinder, a first inner ring sliding block, a second inner ring sliding block, a first electric cylinder, a second electric cylinder, a first detection bar, a second detection bar, piezoelectric sensors, a first outer ring adjusting cylinder, a second outer ring adjusting cylinder, a first outer ring guide rail, a second outer ring guide rail, a first outer ring sliding block, a second outer ring sliding block, a third electric cylinder, a fourth electric cylinder, a third detection bar, a fourth detection bar, a positioning cylinder, a left sliding plate, a right sliding plate, a first gear rack, positioning columns, an upper cylinder, a mobile platform, upper guide posts, a servo motor, a rotating table, a clamping guide rail, a clamping cylinder, a right sliding table, a second gear rack, a left sliding table, clamping arms and clamping jaws, wherein a transverse groove and two longitudinal grooves are formed inside the support column, the first inner ring adjusting cylinder and the second inner ring adjusting cylinder being symmetrically mounted in the transverse groove, the output end of the first inner ring adjusting cylinder being connected with the first inner ring sliding block, the output end of the second inner ring adjusting cylinder being connected with the second inner ring sliding block, and both the first inner ring sliding block and the second inner ring sliding block being mounted on the inner ring guide rail;

the first electric cylinder being mounted on the first inner ring sliding block, the first detection bar being mounted at the output end of the first electric cylinder, and a piezoelectric sensor being mounted on the first detection bar; the second electric cylinder being mounted on the second inner ring sliding block, the second detection bar being mounted at the output end of the second electric cylinder, and a piezoelectric sensor being mounted on the second detection bar; the distance between the first detection bar and the second detection bar being able of being adjusted via the first inner ring adjusting cylinder and the second inner ring adjusting cylinder, so that the inner rings of multiple flange diameters can be detected;

the first outer ring adjusting cylinder and the second outer ring adjusting cylinder being symmetrically mounted in the longitudinal grooves, the output end of the first outer ring adjusting cylinder being connected with the first outer ring sliding block, the output end of the second outer ring adjusting cylinder being connected with the second outer ring sliding block, the first outer ring sliding block being mounted on the first outer ring guide rail, and the second outer ring sliding block being mounted on the second outer ring guide rail; the third electric cylinder being mounted on the first outer ring sliding block, the third detection bar being mounted at the output end of the third electric cylinder, and a piezoelectric sensor being mounted on the third detection bar; the fourth electric cylinder being mounted on the second outer ring sliding block, the fourth detection bar being mounted at the output end of the fourth electric cylinder, and a piezoelectric sensor being mounted on the fourth detection bar, and the distance between the third detection bar and the fourth detection bar being able of being adjusted via the first outer ring adjusting cylinder and the second outer ring adjusting cylinder, so that the outer rings of multiple flange diameters can be detected.

\* \* \* \* \*